United States Patent
Ghanbari et al.

(10) Patent No.: US 11,300,977 B2
(45) Date of Patent: Apr. 12, 2022

(54) SYSTEMS AND METHODS FOR CREATING AND USING RISK PROFILES FOR FLEET MANAGEMENT OF A FLEET OF VEHICLES

(71) Applicant: SmartDrive Systems, Inc., San Diego, CA (US)

(72) Inventors: Reza Ghanbari, San Diego, CA (US); Nicholas Shayne Brookins, Encinitas, CA (US); David Forney, La Jolla, CA (US); Jason Palmer, Carlsbad, CA (US); Mark Freitas, San Diego, CA (US)

(73) Assignee: SmartDrive Systems, Inc., Dallas, TX (US)

( * ) Notice: Subject to any disclaimer, the term of this patent is extended or adjusted under 35 U.S.C. 154(b) by 359 days.

(21) Appl. No.: 16/400,841

(22) Filed: May 1, 2019

(65) Prior Publication Data

US 2020/0348692 A1 Nov. 5, 2020

(51) Int. Cl.
*G05D 1/02* (2020.01)
*G06N 5/04* (2006.01)
*B60W 30/095* (2012.01)

(52) U.S. Cl.
CPC ......... *G05D 1/0291* (2013.01); *B60W 30/095* (2013.01); *G05D 1/0221* (2013.01); *G06N 5/046* (2013.01)

(58) Field of Classification Search
CPC . G05D 1/0291; G05D 1/0221; B60W 30/095; B60W 30/0953; B60W 30/0956; B60W 30/08; B60W 30/09; G06N 5/046; G06N 5/047
See application file for complete search history.

(56) References Cited

U.S. PATENT DOCUMENTS

| 7,219,067 | B1 * | 5/2007 | McMullen | .......... | B61L 27/0011 |
| | | | | | 705/4 |
| 7,590,616 | B2 * | 9/2009 | Guan | ...................... | G06Q 30/02 |
| 7,930,232 | B2 * | 4/2011 | Cooper | .................. | G06Q 40/06 |
| | | | | | 705/36 R |

(Continued)

OTHER PUBLICATIONS

PCT International Search Report and Written Opinion for PCT Application No. PCT/US2020/027035, dated Jun. 19, 2020 (14 pages).

*Primary Examiner* — Angelina Shudy
(74) *Attorney, Agent, or Firm* — Esplin & Associates, PC

(57) ABSTRACT

Systems and methods for creating and using risk profiles for management of a fleet of vehicles are disclosed. The risk profiles characterize values representing likelihoods of occurrences of vehicle events, based on previously detected vehicle events. Exemplary implementations may: obtain vehicle event information for vehicle events that have been detected by the fleet of vehicles; aggregate the vehicle event information for multiple ones of the events to create one or more of a first risk profile, a second risk profile and/or a third risk profile; obtain a point of origin for and a target destination of a particular vehicle; determine a set of routes from the point of origin to the target destination; determine individual values representing likelihoods of occurrences of vehicle events along individual routes in the set of routes; select the first route from the set of routes; and provide the selected first route to the particular vehicle.

18 Claims, 3 Drawing Sheets

(56) References Cited

U.S. PATENT DOCUMENTS

| | | | | |
|---|---|---|---|---|
| 8,326,746 | B1* | 12/2012 | Crawford | G06Q 40/02 705/38 |
| 8,915,738 | B2* | 12/2014 | Mannino | G09B 9/052 434/65 |
| 8,989,959 | B2* | 3/2015 | Plante | B60W 40/08 701/33.4 |
| 9,226,004 | B1* | 12/2015 | Plante | H04N 7/183 |
| 9,298,809 | B2* | 3/2016 | Kemp | G06F 16/3334 |
| 9,625,266 | B1 | 4/2017 | Chintakindi | |
| 9,852,475 | B1 | 12/2017 | Konrardy | |
| 9,898,759 | B2* | 2/2018 | Khoury | B60W 40/09 |
| 10,083,493 | B1 | 9/2018 | Davis | |
| 10,129,221 | B1* | 11/2018 | McClendon | H04W 12/02 |
| 10,203,212 | B2* | 2/2019 | Mazzella | G01C 21/3626 |
| 10,204,528 | B2* | 2/2019 | Truong | B60W 40/09 |
| 10,371,542 | B2* | 8/2019 | O'Herlihy | G06Q 30/02 |
| 10,402,771 | B1* | 9/2019 | De | G08G 1/0967 |
| 10,445,950 | B1* | 10/2019 | De | G07C 5/0833 |
| 10,591,311 | B2* | 3/2020 | Augst | B60W 50/14 |
| 10,664,922 | B1 | 5/2020 | Madigan | |
| 10,672,198 | B2* | 6/2020 | Brinig | H04W 4/027 |
| 10,679,497 | B1* | 6/2020 | Konrardy | G08G 1/096725 |
| 10,789,838 | B2* | 9/2020 | Amacker | G08G 1/096783 |
| 11,124,186 | B1* | 9/2021 | Konrardy | G05D 1/0214 |
| 11,175,660 | B1* | 11/2021 | Fields | B60W 40/09 |
| 2002/0111172 | A1* | 8/2002 | DeWolf | G06Q 30/02 455/456.3 |
| 2003/0154009 | A1* | 8/2003 | Basir | G07C 5/0866 701/32.2 |
| 2004/0236596 | A1 | 11/2004 | Chowdhary | |
| 2005/0097028 | A1* | 5/2005 | Watanabe | G06Q 30/02 705/37 |
| 2007/0001831 | A1* | 1/2007 | Raz | G09B 21/009 340/439 |
| 2008/0004638 | A1 | 1/2008 | Baker | |
| 2009/0234552 | A1* | 9/2009 | Takeda | B60W 40/09 701/96 |
| 2010/0063850 | A1* | 3/2010 | Daniel | G06Q 40/025 705/4 |
| 2010/0157061 | A1* | 6/2010 | Katsman | G07C 5/0866 348/149 |
| 2011/0173015 | A1* | 7/2011 | Chapman | G08G 1/0104 705/1.1 |
| 2011/0178702 | A1* | 7/2011 | Lassesson | G08G 1/09685 701/408 |
| 2012/0174111 | A1* | 7/2012 | Pala | G06F 3/011 718/102 |
| 2012/0191343 | A1* | 7/2012 | Haleem | G01C 21/3461 701/431 |
| 2013/0189649 | A1* | 7/2013 | Mannino | G09B 9/052 434/65 |
| 2013/0198031 | A1* | 8/2013 | Mitchell | G06Q 10/047 705/26.8 |
| 2014/0073362 | A1* | 3/2014 | Kawata | G06Q 50/01 455/456.3 |
| 2014/0180730 | A1* | 6/2014 | Cordova | H04W 4/38 705/4 |
| 2014/0372226 | A1* | 12/2014 | Pavley | G06Q 30/0269 705/14.66 |
| 2015/0064659 | A1 | 3/2015 | Dubens | |
| 2015/0223024 | A1* | 8/2015 | Abuodeh | H04W 74/06 455/456.3 |
| 2015/0266455 | A1* | 9/2015 | Wilson | B60W 30/10 701/93 |
| 2015/0278855 | A1* | 10/2015 | Khoury | G06Q 30/0273 705/14.49 |
| 2016/0117872 | A1* | 4/2016 | Plante | H04N 21/4334 701/32.2 |
| 2017/0010109 | A1* | 1/2017 | Hayon | G01C 21/36 |
| 2017/0032324 | A1 | 2/2017 | Grover | |
| 2017/0123421 | A1* | 5/2017 | Kentley | G08G 1/202 |
| 2017/0132117 | A1* | 5/2017 | Stefan | G06F 11/3604 |
| 2017/0221149 | A1* | 8/2017 | Hsu-Hoffman | G06Q 40/08 |
| 2017/0255966 | A1* | 9/2017 | Khoury | H04L 67/20 |
| 2017/0323244 | A1* | 11/2017 | Rani | G06Q 10/06393 |
| 2018/0086347 | A1* | 3/2018 | Shaikh | G01C 21/3626 |
| 2018/0089605 | A1* | 3/2018 | Poornachandran | G06Q 30/0282 |
| 2018/0130095 | A1* | 5/2018 | Khoury | G07C 5/085 |
| 2018/0157979 | A1* | 6/2018 | Dehaghani | G06Q 10/1093 |
| 2018/0253769 | A1* | 9/2018 | Ye | G06Q 30/0641 |
| 2018/0339712 | A1* | 11/2018 | Kislovskiy | B60W 50/0205 |
| 2018/0340790 | A1 | 11/2018 | Kislovskiy | |
| 2018/0341888 | A1 | 11/2018 | Kislovskiy | |
| 2018/0350144 | A1* | 12/2018 | Rathod | A63F 13/216 |
| 2018/0356814 | A1* | 12/2018 | Brooks | A61B 5/0205 |
| 2019/0005812 | A1* | 1/2019 | Matus | G08G 1/0112 |
| 2019/0022347 | A1* | 1/2019 | Wan | A61M 21/00 |
| 2019/0102840 | A1 | 4/2019 | Perl | |
| 2019/0212453 | A1* | 7/2019 | Natroshvili | G08G 1/166 |
| 2020/0101969 | A1* | 4/2020 | Natroshvili | G06N 20/00 |
| 2020/0241564 | A1* | 7/2020 | Goldman | G06Q 50/30 |
| 2020/0348675 | A1 | 11/2020 | Brookins | |
| 2020/0348693 | A1* | 11/2020 | Forney | G05D 1/0055 |
| 2020/0357175 | A1* | 11/2020 | Silverstein | G06Q 10/0635 |
| 2021/0049714 | A1* | 2/2021 | Shaaban | G06F 16/9535 |
| 2021/0089780 | A1* | 3/2021 | Chang | G11B 27/34 |
| 2021/0312525 | A1* | 10/2021 | Goenka | H04W 4/029 |
| 2021/0331668 | A1* | 10/2021 | Udipi | G08G 1/0145 |

\* cited by examiner

SYSTEMS AND METHODS FOR CREATING AND USING RISK PROFILES FOR FLEET MANAGEMENT OF A FLEET OF VEHICLES

FIELD OF THE DISCLOSURE

The present disclosure relates to systems and methods for creating and using risk profiles for fleet management of a fleet of vehicles. Risk profiles may be specific to one or more of individual locations or areas, vehicle types, types of vehicle events, and/or vehicle operators.

BACKGROUND

Systems configured to record, store, and transmit video, audio, and sensor data associated with a vehicle, e.g. to monitor the speed of a vehicle, are known. Such systems may detect vehicle events such as speeding and transmit relevant event information to a stakeholder. Systems for monitoring and managing a fleet of vehicles are known.

SUMMARY

One aspect of the present disclosure relates to a system configured for creating and using risk profiles for fleet management of a fleet of vehicles. The risk profiles may characterize values representing likelihoods of occurrences of vehicle events. The values may be based on previously detected vehicle events. The system may include one or more hardware processors configured by machine-readable instructions. The processor(s) may be configured to obtain vehicle event information for vehicle events that have been detected by the fleet of vehicles. The vehicle event information for the vehicle events may include locations of the vehicle events, vehicle types involved in the vehicle events, types of the vehicle events, and/or other information. The processor(s) may be configured to aggregate the vehicle event information for multiple ones of the events to create one or more of a first risk profile, a second risk profile and/or a third risk profile. The first risk profile may be specific to individual locations. The first risk profile may characterize a first set of values representing likelihoods of occurrences of vehicle events at the individual locations. The second risk profile may be specific to individual vehicle types. The second risk profile may characterize a second set of values representing likelihoods of occurrences of vehicle events pertaining to the individual vehicle types. The third risk profile may be specific to individual types of the vehicle events. The third risk profile may characterize a third set of values representing likelihoods of occurrences of vehicle events of the individual types of the vehicle events. The processor(s) may be configured to obtain a point of origin for a particular vehicle and a target destination the particular vehicle is intended to reach. The particular vehicle may have a particular vehicle type. The processor(s) may be configured to determine a set of routes from the point of origin to the target destination. The set of routes may include at least two different routes. The processor(s) may be configured to determine individual values representing likelihoods of occurrences of vehicle events along individual routes in the set of routes. Determining the individual values (representing the likelihoods) may be based on one or more of the first risk profile, the second risk profile, and the third risk profile. The set of routes may include a first route and a second route. The determinations of the individual values may include a first determination of a first individual value for the first route and a second determination of a second individual value for the second route. The processor(s) may be configured to select the first route from the set of routes. The first route may be selected such that the first individual value representing likelihood of occurrences of vehicle events along the first route is lower than the second individual value representing likelihood of occurrences of vehicle events along the second route. In other words, the likelihood of occurrences along the first route may be lower than the likelihood along the second route. The processor(s) may be configured to provide the selected first route to the particular vehicle.

Another aspect of the present disclosure relates to a method for creating and using risk profiles for fleet management of a fleet of vehicles. The risk profiles may characterize values representing likelihoods of occurrences of vehicle events. The values may be based on previously detected vehicle events. The method may include obtaining vehicle event information for vehicle events that have been detected by the fleet of vehicles. The vehicle event information for the vehicle events may include locations of the vehicle events, vehicle types involved in the vehicle events, types of the vehicle events, and/or other information. The method may include aggregating the vehicle event information for multiple ones of the events to create one or more of a first risk profile, a second risk profile and/or a third risk profile. The first risk profile may be specific to individual locations. The first risk profile may characterize a first set of values representing likelihoods of occurrences of vehicle events at the individual locations. The second risk profile may be specific to individual vehicle types. The second risk profile may characterize a second set of values representing likelihoods of occurrences of vehicle events pertaining to the individual vehicle types. The third risk profile may be specific to individual types of the vehicle events. The third risk profile may characterize a third set of values representing likelihoods of occurrences of vehicle events of the individual types of the vehicle events. The method may include obtaining a point of origin for a particular vehicle and a target destination the particular vehicle is intended to reach. The particular vehicle may have a particular vehicle type. The method may include determining a set of routes from the point of origin to the target destination. The set of routes may include at least two different routes. The method may include determining individual values representing likelihoods of occurrences of vehicle events along individual routes in the set of routes. Determining the individual values (representing the likelihoods) may be based on one or more of the first risk profile, the second risk profile, and the third risk profile. The set of routes may include a first route and a second route. The determinations of the individual values may include a first determination of a first individual value for the first route and a second determination of a second individual value for the second route. The method may include selecting the first route from the set of routes. The first route may be selected such that the first individual value representing likelihood of occurrences of vehicle events along the first route is lower than the second individual value representing likelihood of occurrences of vehicle events along the second route. In other words, the likelihood of occurrences along the first route may be lower than the likelihood along the second route. The method may include providing the selected first route to the particular vehicle.

As used herein, any association (or relation, or reflection, or indication, or correspondency) involving servers, processors, client computing platforms, vehicles, vehicle events, risk profiles, likelihoods, locations, vehicle types, event types, routes, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
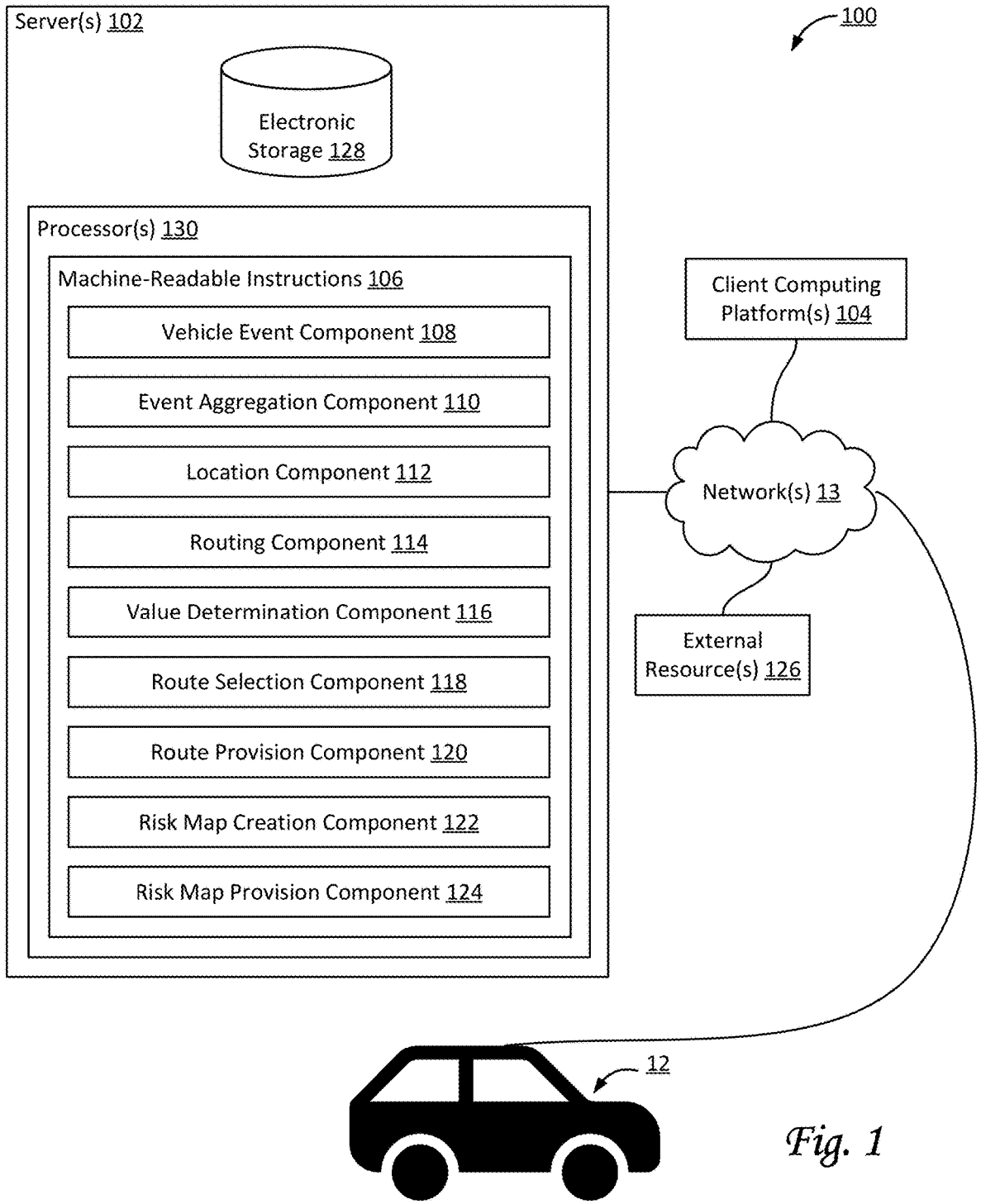
FIG. 1 shows a system configured for creating and using risk profiles for fleet management of a fleet of vehicles, in accordance with one or more implementations.

FIG. 1 illustrates a system 100 configured for creating and using risk profiles for fleet management of a fleet of vehicles, in accordance with one or more implementations. The fleet may include a vehicle 12 and/or other vehicles. In some implementations, system 100 may be configured to couple with vehicle 12 that is operated by a vehicle operator. As used here, the term fleet may refer to a set of at least 5 vehicles, at least 10 vehicles, at least 100 vehicles, at least 1000 vehicles, and/or another number of vehicles. For example, the fleet may include a first vehicle, a second vehicle, a third vehicle, a fourth vehicle, and so forth. Individual vehicles may include a set of resources for data processing and/or electronic storage, including but not limited to persistent storage. Individual vehicles may include a set of sensors configured to generate output signals conveying information, e.g., related to the operation of the individual vehicles.

System 100 may include one or more of vehicle 12, server(s) 102, electronic storage 128, client computing platform(s) 104, external resource(s) 126, network(s) 13, and/or other components. In some implementations, system 100 may be a distributed data center, include a distributed data center, or act as a distributed data center. Alternatively, and/or simultaneously, system 100 may be a remote computing server, include a remote computing server, or act as a remote computing server, where a remote computing server is separate, discrete, and/or distinct from the fleet of vehicles. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

One or more components of system 100 may include one or more processors 130 and/or other mechanisms/components for processing information. For example, a set of resources (not depicted) included in and/or carried by an individual vehicle may include one or more processors. In some implementations, other vehicle-specific components, such as, by way of non-limiting example, a vehicle event recorder (not depicted), may include one or more processors. In some implementations, some or all of the processors may be configured via machine-readable instructions to perform various functions. One or more components of system 100 may include electronic storage 128 and/or other mechanisms/components for storing information. For example, a set of resources included in and/or carried by an individual vehicle may include electronic storage. In some implementations, other vehicle-specific components, such as, by way of non-limiting example, a vehicle event recorder, may include electronic storage. In some implementations, an event recorder may be configured to generate, detect, identify, capture, and/or record information related to the operation of a vehicle. Information related to a vehicle may include, by way of non-limiting example, information related to and/or based on vehicle events. An event recorder may be configured to off-load and/or otherwise transmit information.

A set of resources included in and/or carried by an individual vehicle may include one or more processors, electronic storage, a transceiver (not depicted), and/or other components. The first vehicle may carry a first set of resources. The second vehicle may carry a second set of resources, and so forth. The first set of resources may include a first transceiver. The second set of resources may include a second transceiver, and so forth.

Transceivers may be configured to transfer and/or receive information to and/or from other elements of system 100, including but not limited to other vehicles (or components carried by other vehicles), the remote computing server, and/or other components. In some implementations, transceivers may be configured to transfer and/or receive information wirelessly, and/or otherwise provide resources for the distribution of information. For example, a transceiver may be configured to receive executable code, queries, and/or other information. For example, a transceiver may be configured to transmit results from executable code, responses to queries, and/or other information, e.g., to a remote computing server. In some implementations, the remote computing server may be configured to facilitate presentation of a user interface to a user of the remote computing server, e.g., to query system 100 and/or the fleet of vehicles. In some implementations, transceivers may be configured to obtain, measure, and/or otherwise determine one or more conditions related to data transmissions. For example, one or more current local data transmission conditions may include a current bandwidth (e.g., in MB/s), a current transmission protocol (e.g., LTE, 3G, 4G, 5G, Wi-Fi, etc.), a current transmission cost (e.g., in $/MB), and/or other conditions.

Individual vehicles may include a set of sensors configured to generate output signals conveying information related to the operation of the individual vehicles, the surroundings of individual vehicles, and/or other information. As used herein, transmission and/or distribution of information may be considered a data processing function. As used herein, the terms data and information may be used interchangeably. As used herein, the terms "remote computing server" and "centralized server" may be used interchangeably.

The sensors of a particular vehicle may be referred to as a set of sensors. A set of sensors may be carried by an individual vehicle. A set of sensors may be configured to generate output signals conveying information. In some implementations, the generated information may be related to one or both of the operation of one or more vehicles and the surroundings of one or more vehicles. The generated information may include timing information, location information, (vehicle) operator information, and/or other information. In some implementations, generated information may be associated with timing information (e.g., from a timer), location information, operator information, and/or other information.

In some implementations, timing information may associate and/or otherwise relate the generated output signals with one or more moments of generation by one or more particular sensors. For example, timing information may include time stamps that indicate moments of generation. For example, at a time labeled $t_1$ the speed of a vehicle may be 50 mph, at a time labeled $t_2$ the speed may be 55 mph, and so forth. A set of time stamps or moments in time may form a timeline. In some implementations, location information may associate and/or otherwise relate the generated output signals with one or more locations of generation (or, locations at the moment of generation) by one or more particular sensors. In some implementations, the operator information may associate and/or otherwise relate the generated output signals with individual vehicle operators at the moments of generation. For example, a particular sensor may generate a particular output signal conveying a particular operating parameter of an individual vehicle, such as speed and/or another operating parameter. The particular output signal may include and/or be associated with a timestamp (e.g., time=$t_x$) that indicates when the particular output signal was generated. For example, a series of output signals may be associated with a corresponding series of timestamps. In some implementations, the particular output signal may be associated with a particular vehicle operator. For example, the particular output signal may be associated with the particular vehicle operator that was operating the individual vehicle at the time the particular output signal was generated. In some implementations, a set of resources may be configured to store generated information, timing information, location information, operator information, and/or other information, e.g. in electronic storage.

Server(s) 102 may be configured by machine-readable instructions 106. Machine-readable instructions 106 may include one or more instruction components. The instruction components may include computer program components. The instruction components may include one or more of a vehicle event component 108, a event aggregation component 110, a location component 112, a routing component 114, a likelihood component 116, a route selection component 118, a route provision component 120, a risk map creation component 122, a risk map provision component 124, and/or other instruction components.

Vehicle event component 108 may be configured to obtain and/or otherwise receive information, including but not limited to vehicle event information. In some implementations, vehicle event information may include information for vehicle events that have been detected by the fleet of vehicles. In some implementations, vehicle event information may be structured and/or organized into records representing individual vehicle events. In some implementations, vehicle event information may be structured and/or organized in such a way that multiple individual vehicle events contribute to a single data point within the vehicle event information. For example, such a data point may be an aggregation of information from the information regarding multiple individual vehicle events.

Detection of vehicle events may be based on output signals generated by one or more sensors (not depicted) of an individual vehicle. In some implementations, a sensor may be configured to generate output signals conveying information related to the operation of a vehicle (which may include information related to one or more operating conditions of the vehicle). Information related to the operation of the vehicle may include (feedback) information from one or more of the mechanical systems (not depicted) of the vehicle, and/or other information. In some implementations, at least one of the sensors may be a vehicle system sensor included in an engine control module or electronic control module (ECM) system of the vehicle. An individual sensor may be vehicle-specific.

Individual sensors may be configured to generate output signals conveying information, e.g., vehicle-specific information. The information may include visual information, motion-related information, position-related information, biometric information, and/or other information. In some implementations, one or more components of system 100 may determine one or more parameters that are measured, derived, estimated, approximated, and/or otherwise determined based on one or more output signals generated by one or more sensors.

Sensors may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, a geolocation sensor, global positioning system sensors, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of the system.

As mentioned, individual sensors may include image sensors, cameras, and/or other sensors. As used herein, the terms "camera" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, time-stamped, annotated, and/or otherwise processed such that information captured by other sensors can be synchronized, aligned, annotated, and/or otherwise associated therewith. For example, video information captured by an image sensor may be synchronized with information captured by an accelerometer, GPS unit, or other sensor. Output signals generated by individual image sensors (and/or information based thereon) may be stored and/or transferred in electronic files.

In some implementations, an image sensor may be integrated with electronic storage such that captured information may be stored, at least initially, in the integrated embedded storage of a particular vehicle. In some implementations, one or more components carried by an individual vehicle may include one or more cameras. For example, a camera may include one or more image sensors and electronic storage media. In some implementations, an image sensor may be configured to transfer captured information to one or more components of system 100, including but not limited to remote electronic storage media, e.g. through "the cloud."

By way of non-limiting example, the vehicle event information for the vehicle events may include one or more of locations of vehicle events, vehicle types involved in vehicle events, types of vehicle events, identifiers of vehicle operators involved in vehicle events, and/or other information. For example, locations of vehicle events may include geographical locations, including but not limited to global positioning system (GPS) coordinates. For example, vehicle types may include sedans, vans, trucks, 18-wheelers, and/or other types of vehicles. In some implementations, vehicle types may be classified by weight class and/or by other distinguishing features. For example, types of vehicle events may include speeding events, collision events, near-collision events, and/or other vehicle events. In some implementations, the types of vehicles events may include different types for different segments of a day. For example, identifiers of vehicle operators may include names, identification numbers, employee numbers, and/or other identifiers.

By way of non-limiting example, vehicle event information may be aggregated (e.g., by event aggregation component 110) to create risk profiles. As used herein, the term "vehicle event" may refer to one or more of forward motion, motion in reverse, making a turn, speeding, unsafe driving speed, collisions, near-collisions, driving in a parking lot or garage, being stalled at a traffic light, loading and/or unloading of a vehicle, transferring gasoline to or from the vehicle, and/or other vehicle events in addition to driving maneuvers such as swerving, a U-turn, freewheeling, over-revving, lane-departure, short following distance, imminent collision, unsafe turning that approaches rollover and/or vehicle stability limits, hard braking, rapid acceleration, idling, driving outside a geo-fence boundary, crossing double-yellow lines, passing on single-lane roads, a certain number of lane changes within a certain amount of time or distance, fast lane change, cutting off other vehicles during lane-change speeding, running a red light, running a stop sign, parking a vehicle, performing fuel-inefficient maneuvers, and/or other driving maneuvers or combinations thereof. Some types of vehicle events may be based on the actions or motion of the vehicle itself. Other types of vehicle events may be based on the actions taken or performed by a vehicle operator. Some types of vehicle events may be based on a combination of both the actions or motion of the vehicle itself and the actions taken or performed by a vehicle operator. For example, a particular vehicle event may include hard braking followed (within a predetermined window of time) by a sharp turn and/or swerve. This particular vehicle event may indicate a near-collision that was severe enough that the vehicle operator decided that merely braking hard would not be sufficient to avoid the collision. Another example of a vehicle event that includes a combination of actions may be a lane change followed (within a predetermined window of time) by hard braking, which may indicate a poor decision to initiate the lane change. In some implementations, a particular type of vehicle event may involve a vehicle exceeding a speed threshold. In some implementations, a particular type of vehicle event may involve collisions and near-collisions of a vehicle.

Event aggregation component 110 may be configured to aggregate the vehicle event information for multiple ones of the events. In some implementations, event aggregation component 110 may be configured to aggregate the vehicle event information to create one or more of a first risk profile, a second risk profile, a third risk profile, a fourth risk profile, and/or other risk profiles. The first risk profile may be specific to individual locations. The first risk profile may characterize a first set of values representing likelihoods of occurrences of vehicle events at the individual locations. The second risk profile may be specific to individual vehicle types. The second risk profile may characterize a second set of values representing likelihoods of occurrences of vehicle events pertaining to the individual vehicle types. The third risk profile may be specific to individual types of the vehicle events. The third risk profile may characterize a third set of values representing likelihoods of occurrences of vehicle events of the individual types of the vehicle events. The fourth risk profile may be specific to individual vehicle operators. The fourth risk profile may characterize a fourth set of values representing likelihoods of occurrences of vehicles events involving the individual vehicle operators.

Location component 112 may be configured to obtain and/or otherwise receive information related to current and/or intended locations of vehicles. In some implementations, location component 112 may be configured to obtain points of origin for individual vehicles. In some implementations, location component 112 may be configured to obtain target destinations for individual vehicles. Target destinations may be locations the individual vehicles intended to reach. The particular vehicle may be being operated by a particular vehicle operator. In some implementations, obtaining a point of origin for a particular vehicle and a target destination for the particular vehicle may include receiving information from the particular vehicle, its vehicle operator, and/or from an external resources involved in route planning for the particular vehicle. The received information may represent a point of origin for the particular vehicle and a target destination. The particular vehicle may have a particular vehicle type, including but not limited to a particular weight class for the vehicle.

Figure 3:
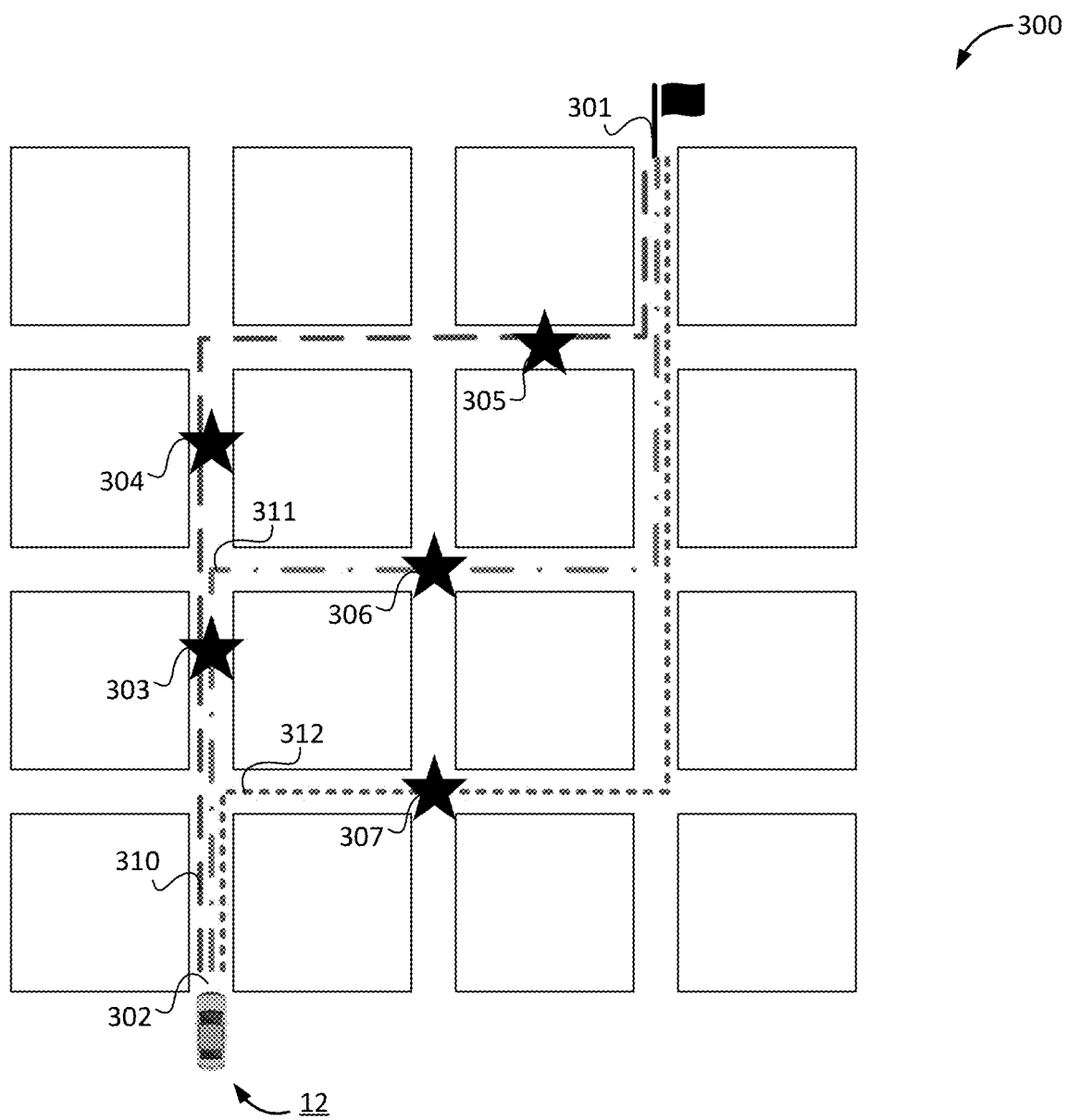
FIG. 3 illustrates a map depicting a geographical area and various routes for a vehicle, as may be used by a system configured for creating and using risk profiles for fleet management of a fleet of vehicles, in accordance with one or more implementations.

Routing component 114 may be configured to determine routes for vehicles. In some implementations, routing component 114 may be configured to determine a set of routes from a point of origin to a target destination (e.g., for a particular vehicle). In some implementations, a particular set of routes may include at least two different routes. In some implementations, a particular set of routes may include at least three different routes, and/or more than three different routes. For example, a set of routes may include a first route, a second route, a third route, and so forth. By way of non-limiting example, FIG. 3 illustrates a map 300 depicting a geographical area around vehicle 12 and various routes. For example, map 300 may include a target destination 301 for vehicle 12. For example, map 300 may include a point of origin 302 for vehicle 12. For example, point of origin 302 may be the current location of vehicle 12. A routing component similar to or the same as routing component 114 may determine a first route 310, a second route 311, a third route 312, and/or other routes from point of origin 302 to target destination 301. Identifiers 303, 304, 305, 306, and 307 may represent previously detected vehicle events, also referred to as event 303, event 304, event 305, event 306, and event 307, respectively.

Referring to FIG. 1, likelihood component 116 may be configured to determine individual values representing likelihoods. For example, the individual values may be numerical values, percentages, and/or other types of values. In some implementations, the determined individual values may represent likelihoods of occurrences of vehicle events along one or more routes and/or near one or more locations. For example, the one or more routes may be the individual routes in a set of routes determined by routing component 114. By way of non-limiting example, determining the individual values may be based on one or more risk profiles. For example, a particular individual value may be based on one or more of the first, second, and/or third risk profile. In some implementations, determining one or more individual values may be based on one or more of the first, second, third, and/or fourth risk profile. For example, determining the individual values may include determining the individual values representing likelihoods of occurrences of collisions and near-collisions along the individual routes in the set of routes. In some implementations, the set of routes may include a first route, a second route, a third route, and so forth. The determinations by likelihood component 116 may include a first determination of a first individual value for the first route, a second determination of a second individual value for the second route, a third determination of a third individual value for the third route, and so forth.

By way of non-limiting example, FIG. 3 illustrates map 300 depicting a geographical area around vehicle 12 and first route 310, second route 311, and third route 312. A likelihood component similar to or the same as likelihood component 116 may determine a first value representing a first likelihood of occurrences of vehicle events along first route 310, a second value representing a second likelihood of occurrences of vehicle events along second route 311, and a third value representing a third likelihood of occurrences of vehicle events along third route 312. For example, assuming events are treated equally and the quantity of events is used to determine likelihoods, the first value may be 6%, based on event 303, event 304, and event 305 along the route. For example, the second value may be 4%, based on event 303 and event 306 along the route. For example, the third value may be 2%, based on event 307 along the route. In this example, third route 312 may be selected and/or used to route vehicle 12 to target destination 301.

In some implementations, the first, second, and third value may be based on the first risk profile (i.e., based on individual locations of previously detected vehicle events). In this example, third route 312 may be selected and/or used to route vehicle 12 to target destination 301. In some implementations, the first, second, and third value may be based on the first risk profile and the second risk profile. For example, assume that events 303, 304, and 305 happened to a sedan, while events 306 and 307 happened to a truck. If vehicle 12 is a truck, the first value might be lower than the second and third value. If vehicle 12 is a sedan, the first value might be higher than the second and third value.

In some implementations, the first, second, and third value may be based on the first risk profile and the third risk profile. For example, assume that events 303, 304, and 305 involved hard braking, while events 306 and 307 involved collisions. If collision events are weighed more heavily than hard-breaking events, the first value might be higher than the second and third value. In some implementations, the first, second, and third value may be based on the first risk profile, the second risk profile, and the third risk profile.

Referring to FIG. 1, in some implementations, determinations by likelihood component 116 of the individual values for a particular vehicle operator may be performed such that previously detected vehicle events that involved the particular vehicle operator weigh more heavily than previously detected vehicle events that did not involve the particular vehicle operator. By way of non-limiting example, FIG. 3 illustrates map 300 depicting a geographical area around vehicle 12 and first route 310, second route 311, and third route 312. For example, based on the quantity of events along the different routes, and as initially determined, the first value may be 6%, the second value may be 4%, and the third value may be 2%. However, if event 307 previously happened to vehicle 12 a likelihood component similar to or the same as likelihood component 116 may be configured to adjust values involving detected events of vehicle 12 along the different routes. Accordingly, the third value may be adjusted from 2% to 20%. Alternatively, and/or simultaneously, third route 312 may be deemed ineligible for selection based on event 307 having happened to vehicle 12. After such an adjustment, in this example, second route 311 may be selected and/or used to route vehicle 12 to target destination 301.

Referring to FIG. 1, route selection component 118 may be configured to select the first route from the set of routes. The first route may be selected such that the first individual value representing likelihood of occurrences of vehicle events along the first route is lower than the second individual value representing likelihood of occurrences of vehicle events along the second route. In some implementations, the first route may be selected such that the first individual value representing likelihood of occurrences of vehicle events along the first route is lower than other individual values representing likelihoods of occurrences of vehicle events along other routes, e.g., the second route and/or the third route.

Route provision component 120 may be configured to provide routes to vehicles. For example, route provision component 120 may be configured to provide the selected first route (as selected by route selection component 118) to a particular vehicle. In some implementations, route provision component 120 may be configured to effectuate a transfer of information (such as a route) through a transceiver and/or other transmission components. In some implementations, provided routes may be presented to vehicle operators, e.g., through a user interface. In some implementations, provided routes may be used to control autonomous vehicle operators and/or autonomous operation of a vehicle.

Risk map creation component 122 may be configured to create a risk map of a geographical area. The risk map may be based on one or more risk profiles. For example, a risk map may be based on the first risk profile. For example, a risk map may be based on the combination of the first risk profile and the third risk profile. For example, a risk map may be based on the combination of the first risk profile, the third risk profile, and the fourth risk profile. Other combinations of risk profiles are envisioned within the scope of this disclosure. The risk map may characterize values representing likelihoods of occurrences of vehicles events at specific locations within the geographical area.

Risk map provision component 124 may be configured to provide risk maps to vehicles, vehicle operators, and/or other users. For example, risk map provision component 124 may be configured to provide a risk map as created by risk map creation component 122 to a particular vehicle, a particular vehicle operator, and/or other users. In some implementations, risk map provision component 124 may be configured to effectuate a transfer of information (such as a risk map) through a transceiver and/or other transmission components. In some implementations, provided risk maps may be presented to vehicle operators, e.g., through a user interface. In some implementations, provided risk maps may be used to control autonomous vehicle operators and/or autonomous operation of a vehicle.

In some implementations, one or more of server(s) 102, client computing platform(s) 104, and/or external resources 126 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100. For example, contextual information related to weather conditions may be received from a particular external provider that provides weather information. For example, contextual information related to road surface conditions may be received from a particular external provider that provides road condition information. For example, contextual information related to traffic conditions may be received from a particular external provider that provides traffic information. In some implementations, external resources 126 include one or more external providers.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 116, 118, 120, 122, and/or 124, and/or other components. Processor(s) 130 may be configured to execute components 108, 110, 112, 114, 116, 118, 120, 122, and/or 124, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, and/or 124 are illustrated in FIG. 1 as being implemented within a single processing unit, in implementations in which processor(s) 130 includes multiple processing units, one or more of components 108, 110, 112, 114, 116, 118, 120, 122, and/or 124 may be implemented remotely from the other components. The description of the functionality provided by the different components 108, 110, 112, 114, 116, 118, 120, 122, and/or 124 described below is for illustrative purposes, and is not intended to be limiting, as any of components 108, 110, 112, 114, 116, 118, 120, 122, and/or 124 may provide more or less functionality than is described. For example, one or more of components 108, 110, 112, 114, 116, 118, 120, 122, and/or 124 may be eliminated, and some or all of its functionality may be provided by other ones of components 108, 110, 112, 114, 116, 118, 120, 122, and/or 124. As another example, processor(s) 130 may be configured to execute one or more additional components that may perform some or all of the functionality attributed below to one of components 108, 110, 112, 114, 116, 118, 120, 122, and/or 124.

Figure 2:
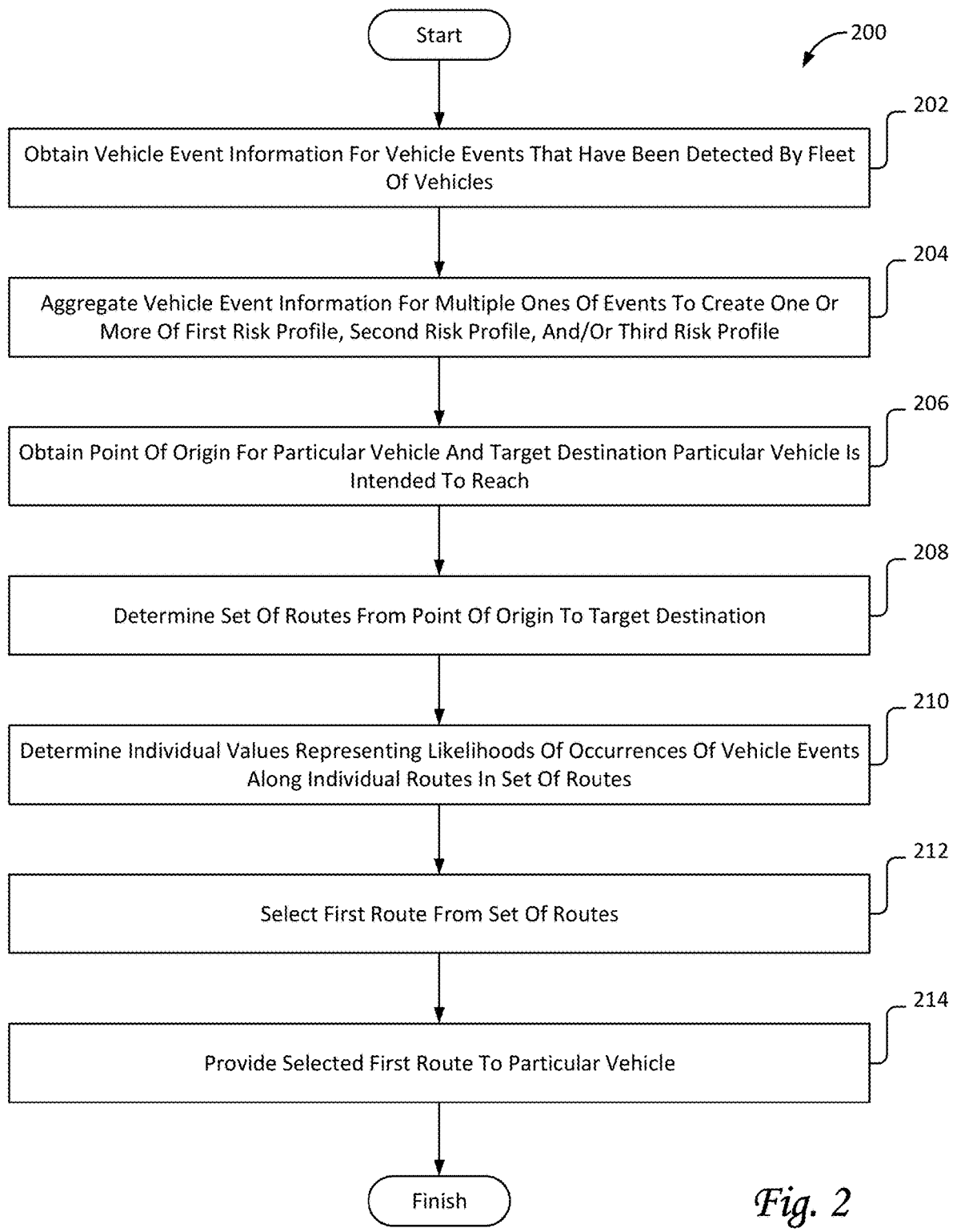
FIG. 2 includes a flow chart of a method for creating and using risk profiles for fleet management of a fleet of vehicles, in accordance with one or more implementations.

FIG. 2 illustrates a method 200 for creating and using risk profiles for fleet management of a fleet of vehicles, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining vehicle event information for vehicle events that have been detected by the fleet of vehicles. The vehicle event information for the vehicle events may include locations of the vehicle events, vehicle types involved in the vehicle events, and types of the vehicle events. Operation 202 may be performed by one or more hardware processors configured by machine-readable instructions including a component that is the same as or similar to vehicle event component 108, in accordance with one or more implementations.

An operation 204 may include aggregating the vehicle event information for multiple ones of the events to create one or more of a first risk profile, a second risk profile and/or a third risk profile. The first risk profile may be specific to individual locations. The first risk profile may characterize a first set of values representing likelihoods of occurrences of vehicle events at the individual locations. The second risk profile may be specific to individual vehicle types. The second risk profile may characterize a second set of values representing likelihoods of occurrences of vehicle events pertaining to the individual vehicle types. The third risk profile may be specific to individual types of the vehicle events. The third risk profile may characterize a third set of values representing likelihoods of occurrences of vehicle events of the individual types of the vehicle events. Operation 204 may be performed by one or more hardware processors configured by machine-readable instructions including a component that is the same as or similar to event aggregation component 110, in accordance with one or more implementations.

An operation 206 may include obtaining a point of origin for a particular vehicle and a target destination the particular vehicle is intended to reach. The particular vehicle may have a particular vehicle type. Operation 206 may be performed by one or more hardware processors configured by machine-readable instructions including a component that is the same as or similar to location component 112, in accordance with one or more implementations.

An operation 208 may include determining a set of routes from the point of origin to the target destination. The set of routes may include at least two different routes. Operation 208 may be performed by one or more hardware processors configured by machine-readable instructions including a component that is the same as or similar to routing component 114, in accordance with one or more implementations.

An operation 210 may include determining individual values representing likelihoods of occurrences of vehicle events along individual routes in the set of routes. Determining the individual values may be based on one or more of the first risk profile, the second risk profile, and the third risk profile. The set of routes may include a first route and a second route. The determinations may include a first determination of a first individual value for the first route and a second determination of a second individual value for the second route. Operation 210 may be performed by one or more hardware processors configured by machine-readable instructions including a component that is the same as or similar to likelihood component 116, in accordance with one or more implementations.

An operation 212 may include selecting the first route from the set of routes. The first route may be selected such that the first individual value representing likelihood of occurrences of vehicle events along the first route is lower than the second individual value representing likelihood of occurrences of vehicle events along the second route. Operation 212 may be performed by one or more hardware processors configured by machine-readable instructions including a component that is the same as or similar to route selection component 118, in accordance with one or more implementations.

An operation 214 may include providing the selected first route to the particular vehicle. Operation 214 may be performed by one or more hardware processors configured by machine-readable instructions including a component that is the same as or similar to route provision component 120, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for creating and using risk profiles for fleet management of a fleet of vehicles, wherein the risk profiles characterize values representing likelihoods of occurrences of vehicle events, wherein the values are based on previously detected vehicle events, the system comprising:
one or more hardware processors configured by machine-readable instructions to:
obtain vehicle event information for vehicle events that have been detected by the fleet of vehicles, wherein the vehicle event information for the vehicle events includes locations of the vehicle events, vehicle types involved in the vehicle events, and types of the vehicle events;
aggregate the vehicle event information for multiple ones of the events to create one or more of a first risk profile, a second risk profile and/or a third risk profile, wherein the first risk profile is specific to individual locations, wherein the first risk profile characterizes a first set of values representing likelihoods of occurrences of vehicle events at the individual locations, wherein the second risk profile is specific to individual vehicle types, wherein the second risk profile characterizes a second set of values representing likelihoods of occurrences of vehicle events pertaining to the individual vehicle types, wherein the third risk profile is specific to individual types of the vehicle events, wherein the third risk profile characterizes a third set of values representing likelihoods of occurrences of vehicle events of the individual types of the vehicle events;
obtain a point of origin for a particular vehicle and a target destination the particular vehicle is intended to reach, wherein the particular vehicle has a particular vehicle type, wherein the particular vehicle is being operated by a particular vehicle operator;
determine a set of routes from the point of origin to the target destination, wherein the set of routes includes at least two different routes;
determine individual route values for individual routes in the set of routes, wherein the individual route values represent likelihoods of occurrences of vehicle events along the individual routes in the set of routes, wherein determining the individual route values is based on one or more of the first risk profile, the second risk profile, and the third risk profile, wherein determining the individual route values is based on previously detected vehicle events, wherein the previously detected vehicle events that involved the particular vehicle operator are weighed more heavily in determining the individual route values than the previously detected vehicle events that did not involve the particular vehicle operator, wherein the set of routes includes a first route and a second route, wherein the determinations include a first determination of a first individual route value for the first route and a second determination of a second individual route value for the second route;
responsive to the first individual route value being lower than the second individual route value, select the first route from the set of routes; and
provide the selected first route to the particular vehicle.

2. The system of claim 1, wherein the vehicle event information is aggregated to create the first, second, and third risk profile, wherein determining the individual route values for the individual routes in the set of routes is based on the first, second, and third risk profile.

3. The system of claim 1, wherein the vehicle event information further includes identifiers of vehicle operators involved in the vehicle events, wherein aggregating the vehicle event information further creates a fourth risk profile that is specific to individual vehicle operators, wherein the fourth risk profile characterizes a fourth set of values representing likelihoods of occurrences of vehicles events involving the individual vehicle operators, wherein determining the individual route values for the individual routes in the set of routes is based on the first, second, third, and fourth risk profile.

4. The system of claim 1, wherein the types of the vehicle events include a first type of vehicle event, and wherein the first type of vehicle event involves a vehicle exceeding a speed threshold.

5. The system of claim 1, wherein the types of the vehicle events include a first type of vehicle event, and wherein the first type of vehicle event involves one or more of swerving, a U-turn, freewheeling, over-revving, lane-departure, short following distance within a predetermined distance, imminent collision, unsafe turning that approaches rollover and/or vehicle stability limits, hard braking exceeding a deceleration threshold, rapid acceleration exceeding an acceleration threshold, idling, driving outside a geo-fence boundary, crossing double-yellow lines, passing on single-lane roads, a certain number of lane changes within a certain amount of time or distance, fast lane change, cutting off other vehicles during lane-change speeding, running a red light, running a stop sign, parking a vehicle, and/or performing fuel-inefficient maneuvers.

6. The system of claim 1, wherein determining the individual route values includes determining the individual values representing likelihoods of occurrences of collisions along the individual routes in the set of routes.

7. The system of claim 1, wherein obtaining the point of origin for the particular vehicle and the target destination includes receiving information from the particular vehicle, wherein the received information represents the point of origin for the particular vehicle and the target destination.

8. The system of claim 1, wherein the one or more hardware processors are further configured by machine-readable instructions to:
create a risk map of a geographical area, wherein the risk map is based on the first risk profile and the third risk profile, and wherein the risk map characterizes values representing likelihoods of occurrences of vehicles events at specific locations within the geographical area; and
provide the risk map to the particular vehicle.

9. The system of claim 1, wherein the types of the vehicle events include different types of the vehicle events for different segments of a day.

10. A method for creating and using risk profiles for fleet management of a fleet of vehicles, wherein the risk profiles characterize values representing likelihoods of occurrences of vehicle events, wherein the values are based on previously detected vehicle events, the method comprising:
obtaining vehicle event information for vehicle events that have been detected by the fleet of vehicles, wherein the vehicle event information for the vehicle events includes locations of the vehicle events, vehicle types involved in the vehicle events, and types of the vehicle events;
aggregating the vehicle event information for multiple ones of the events to create one or more of a first risk profile, a second risk profile and/or a third risk profile, wherein the first risk profile is specific to individual locations, wherein the first risk profile characterizes a first set of values representing likelihoods of occurrences of vehicle events at the individual locations, wherein the second risk profile is specific to individual vehicle types, wherein the second risk profile characterizes a second set of values representing likelihoods of occurrences of vehicle events pertaining to the individual vehicle types, wherein the third risk profile is specific to individual types of the vehicle events, wherein the third risk profile characterizes a third set of values representing likelihoods of occurrences of vehicle events of the individual types of the vehicle events;

obtaining a point of origin for a particular vehicle and a target destination the particular vehicle is intended to reach, wherein the particular vehicle has a particular vehicle type, and wherein the particular vehicle is being operated by a particular vehicle operator;

determining a set of routes from the point of origin to the target destination, wherein the set of routes includes at least two different routes;

determining individual route values for individual routes in the set of routes, wherein the individual route values represent likelihoods of occurrences of vehicle events along the individual routes in the set of routes, wherein determining the individual route values is based on one or more of the first risk profile, the second risk profile, and the third risk profile, wherein determining the individual route values is based on previously detected vehicle events, wherein the previously detected vehicle events that involved the particular vehicle operator are weighed more heavily in determining the individual route values than the previously detected vehicle events that did not involve the particular vehicle operator, wherein the set of routes includes a first route and a second route, wherein the determinations include a first determination of a first individual route value for the first route and a second determination of a second individual route value for the second route;

responsive to the first individual route value being lower than the second individual route value, selecting the first route from the set of routes; and providing the selected first route to the particular vehicle.

11. The method of claim 10, wherein the vehicle event information is aggregated to create the first, second, and third risk profile, wherein determining the individual route values for the individual routes in the set of routes is based on the first, second, and third risk profile.

12. The method of claim 10, wherein the vehicle event information further includes identifiers of vehicle operators involved in the vehicle events, wherein aggregating the vehicle event information further creates a fourth risk profile that is specific to individual vehicle operators, wherein the fourth risk profile characterizes a fourth set of values representing likelihoods of occurrences of vehicles events involving the individual vehicle operators, wherein determining the individual route values for the individual routes in the set of routes is based on the first, second, third, and fourth risk profile.

13. The method of claim 10, wherein the types of the vehicle events include a first type of vehicle event, and wherein the first type of vehicle event involves a vehicle exceeding a speed threshold.

14. The method of claim 10, wherein the types of the vehicle events include a first type of vehicle event, and wherein the first type of vehicle event involves one or more of swerving, a U-turn, freewheeling, over-revving, lane-departure, short following distance within a predetermined distance, imminent collision, unsafe turning that approaches rollover and/or vehicle stability limits, hard braking exceeding a deceleration threshold, rapid acceleration exceeding an acceleration threshold, idling, driving outside a geo-fence boundary, crossing double-yellow lines, passing on single-lane roads, a certain number of lane changes within a certain amount of time or distance, fast lane change, cutting off other vehicles during lane-change speeding, running a red light, running a stop sign, parking a vehicle, and/or performing fuel-inefficient maneuvers.

15. The method of claim 10, wherein determining the individual route values includes determining the individual values representing likelihoods of occurrences of collisions along the individual routes in the set of routes.

16. The method of claim 10, wherein obtaining the point of origin for the particular vehicle and the target destination includes receiving information from the particular vehicle, wherein the received information represents the point of origin for the particular vehicle and the target destination.

17. The method of claim 10, further comprising:
creating a risk map of a geographical area, wherein the risk map is based on the first risk profile and the third risk profile, and wherein the risk map characterizes values representing likelihoods of occurrences of vehicles events at specific locations within the geographical area; and
providing the risk map to the particular vehicle.

18. The method of claim 10, wherein the types of the vehicle events include different types of the vehicle events for different segments of a day.

* * * * *